United States Patent [19]
McAlister

[11] 4,066,046
[45] Jan. 3, 1978

[54] METHOD AND APPARATUS FOR FUEL INJECTION-SPARK IGNITION SYSTEM FOR AN INTERNAL COMBUSTION ENGINE

[76] Inventor: Roy E. McAlister, 5285 E. Red Rock Drive, Phoenix, Ariz. 85018

[21] Appl. No.: 721,505

[22] Filed: Sept. 8, 1976

Related U.S. Application Data

[63] Continuation of Ser. No. 492,548, July 29, 1974, abandoned, which is a continuation-in-part of Ser. No. 232,575, March 7, 1972, Pat. No. 3,830,204.

[51] Int. Cl.² .............................................. F02B 17/00
[52] U.S. Cl. ........................... 123/32 ST; 123/32 AE; 123/32 SJ
[58] Field of Search .......... 123/32 ST, 32 SA, 32 SP, 123/143 B, 191 S, 191 SP, 32 AE, 32 EA, 32 SJ

[56] References Cited

U.S. PATENT DOCUMENTS

| 2,795,214 | 6/1957 | Shook | 123/32 SJ |
|---|---|---|---|
| 2,981,244 | 4/1961 | Hendrickson | 123/32 AE |
| 3,094,974 | 6/1963 | Barber | 123/32 SA |
| 3,173,409 | 3/1965 | Warren | 123/32 SJ |
| 3,315,650 | 4/1967 | Bishop et al. | 123/32 R |
| 3,318,292 | 5/1967 | Hideg | 123/32 R |
| 3,418,980 | 12/1968 | Benson | 123/139 R X |
| 3,463,134 | 8/1969 | Zechnall et al. | 123/146.5 A |
| 3,999,532 | 12/1976 | Kornhauser | 123/32 SP |

FOREIGN PATENT DOCUMENTS

| 680,016 | 2/1964 | Canada | 123/32 SJ |
|---|---|---|---|

*Primary Examiner*—Ronald H. Lazarus
*Assistant Examiner*—Tony M. Argenbright
*Attorney, Agent, or Firm*—Cushman, Darby & Cushman

[57] ABSTRACT

Method and apparatus for providing improved combustion in an internal combustion engine by spark-ignition of fuel that is directly injected into cylinders to present a stratified fuel-air mixture at time of ignition. Reduced mixing of the fuel and air prior to ignition and thus greater stratification permits improved control of the combustion process to increase power and reduce pollutant emissions.

18 Claims, 17 Drawing Figures

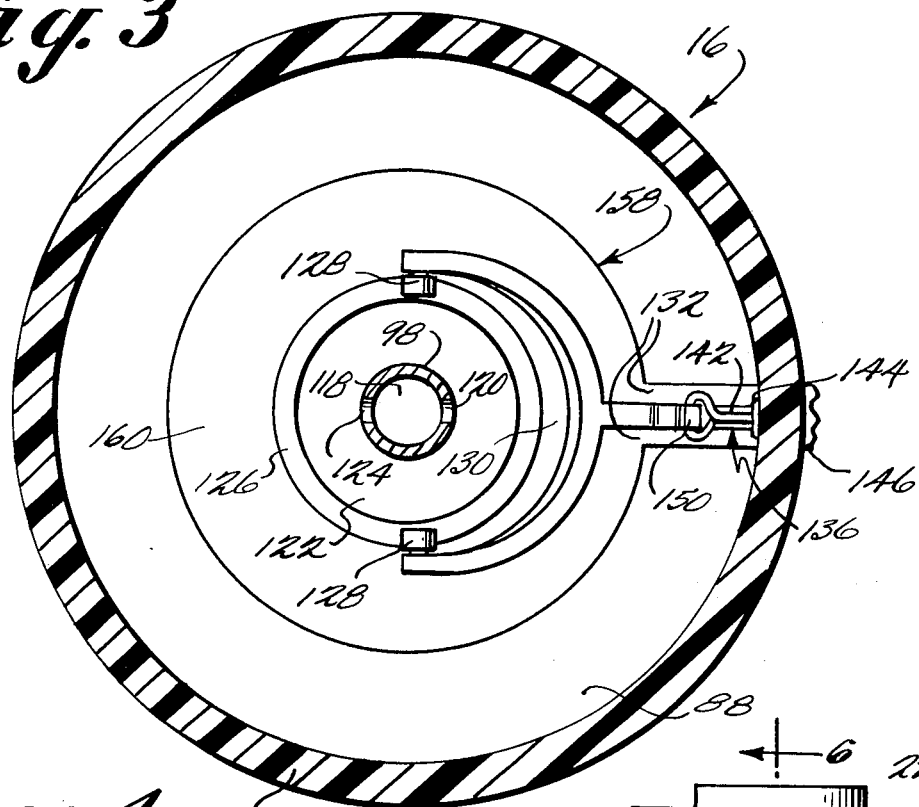
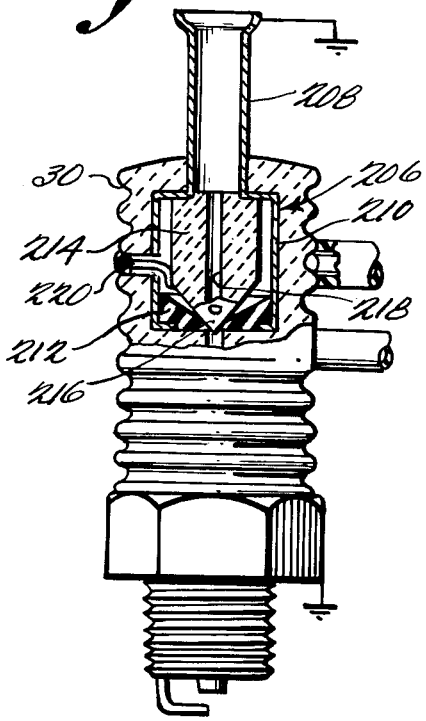
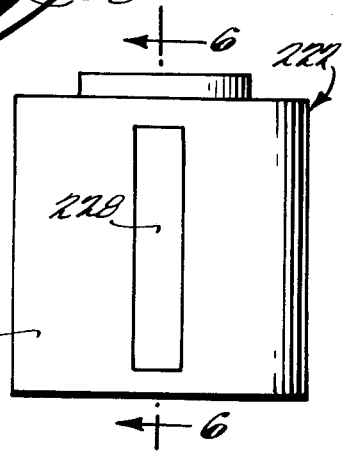
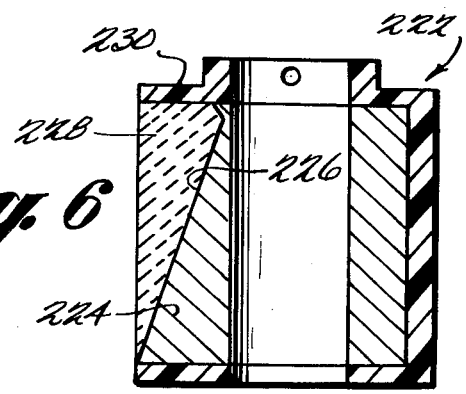

METHOD AND APPARATUS FOR FUEL INJECTION-SPARK IGNITION SYSTEM FOR AN INTERNAL COMBUSTION ENGINE

This is a continuation, of application Ser. No. 492,548 filed July 29, 1974, now abandoned, which is a CIP of Ser. No. 232,575 filed Mar. 7, 1972, now U.S. Pat. No. 3,830,204 issued Aug. 20, 1974.

This invention relates to a system for converting conventional carbureted and spark ignited engines to fuel injected and spark ignited engines.

There are many systems proposed in the patented literature for rendering internal combustion engines capable of operation in a fuel injection and spark ignited mode. In general, these systems have employed elaborate electronic circuits for generating the electrical signals necessary for actuating the fuel injecting mechanisms so that a proper amount of fuel at the proper time is discharged into each combustion chamber. Many of these systems utilize spark plugs modified to provide a fuel outlet discharging directly into the combustion chamber which eliminates the need to provide fuel openings in the engine block.

Despite the disclosed capabilities of known fuel injection-spark ignition systems, in general, these systems have not been adopted to any appreciable extent particularly as conversion packages. Those systems which have been commercially adopted utilize complex electronic circuitry involving sensors for a great variety of varying engine conditions. As a consequence these sophisticated electronic systems have been suitable only as original equipment (as distinguished from conversion systems) where the relatively high costs involved can be included as a part of the greater overall costs of production, as with an automobile or the like.

The present invention is based upon the underlying principle that the costs heretofore encountered can substantially be reduced to a point where a conversion package is economically practial by varying the electrical injection signal as a simple function of the engine rotational speed and the position of the speed control mechanism. Thus, the system of the present invention utilizes two simple physically cooperating structures mounted for relative rotational movement of one with respect to the other and for relative movement with respect to each other between first and second positions and simply coupling the one structure to a rotating element of the engine so that its rotation is at all times a function of engine speed and interconnecting the speed control linkage between the two structures so that they will assume a relative position which is a function of the position of the speed control mechanism. The rotating structure then provides means for generating an electrical injection signal during each cycle of engine operation and change in relative position between the two structures provides means for varying a characteristic of the electrical injection signal by which the amount and timing of the fuel injection can be determined.

Accordingly, it is an object of the present invention to provide a system of fuel injection-spark ignition for an internal combustion engine embodying the principles set forth above so as to obtain the advantages stated and overcome the stated disadvantages of the prior art systems.

Another object of the present invention is the provision of a system of the type described which is constructed as a conversion package for existing internal combustion engines of the carbureted-spark ignition type capable of easy installation by simply replacing the existing distributor cap and spark plugs and disconnecting the fuel line and speed control mechanism from the existing carburetor and effecting connection thereof with components of the present system.

Another object of the present invention is the provision of a system of the type described which is particularly suited to be utilized with a variety of different fuels, such as gasolene (both high and low octane), diesel fuel, methane, propane, methanol, hydrogen, heated kerosene and the like.

A known advantage of fuel injection systems is that they can be made so as to cut off the injection of fuel during deceleration. Such cut-off materially aids in fuel conservation and reduces pollution. The present system is ideally suited to incorporation of the cut-off feature since cut-off is best determined as a function of engine speed and the position of the speed control mechanism. Moreover, in accordance with the principles of the present invention, a smoothly operating cut-off function is obtained by the provision of a damped override to the relative movement between the two structures in a direction corresponding to deceleration so as to limit the rate of deceleration under firing conditions and thereby encourage the operator to decelerate under a no-fire condition, as by completely releasing the accelerator pedal of the speed control mechanism.

Accordingly, it is an object of the present invention to provide a system of fuel injection embodying fuel cut-off during deceleration when the accelerator pedal is fully released and controlled rate deceleration in response to the release of the accelerator until the fully released position is reached.

Another object of the present invention is the provision of an improved fuel injection spark plug.

Serious problems affecting the efficiency power output and pollutant emissions of internal combustion engines are related to the relatively poor control of each combustion event in an engine. In present carbureted gasoline engines, for instance, control over the combustion event ends long before combustion occurs. The pre-mixed fuel and air, once delivered into an intake manifold, cannot be further controlled. Thus, fuel wetting of the intake manifold and cylinder walls, fuel vaporization, variation in vacuum developed during intake, and other factors are uncontrolled for each combustion event. As a result, power output from cylinder to cylinder in a multi-cylinder engine may easily vary up to 40% and more, even in a well-tuned engine. Diesel type or compression-ignited engines gain slightly greater control over combustion events by "solid liquid injecting" or injecting fuel directly into the combustion chamber. However, the greatly increased manufacturing expense, coupled with incomplete control over timing occurrence of combustion by compression, results in a relatively narrow rpm range through which the engine operates at economical efficiencies and presents generally unacceptable or uneconomical performance in many applications.

Attempts have been made to provide various types of fuel injection in automobile engines to improve control over combustion. For instance, injecting fuel into the intake manifold for improved pre-mixing of fuel and air, injecting into "pre-mix" sections of the engine chamber, and other methods have proposed but have achieved relatively limited success in the automotive vehicle market. The limitations of these types of fuel injection, as well as other types wherein fuel is injected directly into the chamber but well mixed prior to initiation of ignition, can be traced to a lack of control of the combustion process.

More particularly, in carbureted, spark ignited internal combustion engines the designs of the cylinder chamber, carburetor, etc, attempt to obtain stoichiometric or at least homogeneous conditions throughout the chamber during the combustion event. Previous attempts to provide fuel injection into such engines, as well as turbocharging and other variations have still had as an end purpose the creation of homogeneous conditions throughout the chamber. Beyond the inherent difficulty associated with attempting to obtain homogeneous conditions in the chamber at a relatively long time after the fuel mixture leaves the carburetor and control over the mixture is lost, several drawbacks are associated with this approach, including formation of excess amounts of pollutant oxides of nitrogen, and condensation or layering of fuel on the relatively cool chamber walls. To reduce the pollutant effect, excess air volumes are introduced into the chamber to reduce formation of nitrogen oxides, but at the expense of engine efficiency. The layering of fuel on the chamber walls creates a relatively fuel rich which has heretofore been desired, dictating that a relatively greater proportion of fuel burning occurs at the walls rather than in the center of the chamber. The heat release adjacent the walls is inefficiently transmitted into heating of the gas in the chamber to cause expansion and useful work, but rather is lost to the chamber walls. Further, upon initiation of the combustion event the relatively cool combustion chamber walls tend to quench the flame, preventing complete combustion of the fuel in this region and thus reducing engine efficiency.

Another approach to engine combustion kinetics control which has been proposed is to attempt to create a nonhomogeneous fuel mixture or "stratified charge" in the chamber rather than homogeneous conditions. In this approach, relatively fuel rich and fuel lean regions are created in the chamber so that more complete combustion occurs and relatively greater power can be produced in a net excess air condition to reduce pollutant emissions. Such attempts include double carburetion with a pair of intake valves, one path delivering a fuel rich mixture to one location in the chamber where it is desired that ignition begin, and another path delivering a more lean mixture to the remainder of the chamber. Another proposed method has been to "solid inject" the fuel directly into the chamber and then mix it with the air by swirling action of the latter during compression to create the stratified charge condition. A drawback common to these approaches, however, is that the layering effect of fuel near the chamber walls has not been reduced, but rather enhanced. The fuel rich region created tends to be at the walls of the chamber, establishing a tendency of the fuel to burn from the walls inwardly toward the more fuel lean chamber center. In the carbureted style of stratified charge, the mixed fuel and air introduced during intake stroke delivers a substantial amount of fuel to the region near the chamber walls. In both the carbureted approach and the solid injection approach, the swirling effect of the air in the chamber causes movement of substantial amount of the fuel to the walls. Also, in many configurations a centrifuge effect is created by the swirling air mass throwing the heavier fuel toward the chamber walls. Accordingly, the same problems discussed above with respect to fuel layering on the chamber walls remain or are enhanced in these stratified charge methods.

An important object of the invention, therefore, is to overcome the aforementioned problems by providing a method of operating an internal combustion engine wherein a fuel rich region concentrated in the center of the chamber is surrounded by a fuel lean region that, at the chamber walls, is extremely fuel lean, and combustion is initiated in the fuel rich region and proceeds toward the fuel lean region.

Another important object is to provide improved control over the combustion event by providing a method of mixing fuel and air within the chamber itself and igniting the mixture to produce the method of operation set forth in the preceding object. As a result, operation of engines utilizing this invention may be readily adapted to minimum pollutant emissions without substantial sacrifice of brake mean effective pressure, i.e., developed engine horsepower, and yet still operate at efficiencies greater than most carbureted engines for improved fuel economy.

More particularly, it is an object of the invention to provide a method of operating an internal combustion engine wherein fuel is injected into the cylinder in a manner creating a "stratified charge" condition, and the combustion event is initiated by electrical spark discharge prior to substantial mixing of the fuel and oxidizing gas. The mixing of the fuel and gas continues during the combustion event while the flame front proceeds from a fuel rich to an extremely fuel lean region in the cylinder. Accordingly, this method of engine operation eliminates the criticality of the condition of fuel and gas mixing at the time of initiation of combustion, and permits far greater control of the combustion event since the timing of fuel injection relative to occurrence of spark discharge can be established so as to account for the various parameters which affect the combustion event. A corollary to this subject is to provide such a method of engine operation wherein timing of the fuel injection relative to spark occurrence controls combustion and to provide apparatus for controlling such fuel injection.

A further object of the invention is to provide a method of engine operation and apparatus therefor as set forth in the preceding objects wherein contact of liquid fuel with the chamber walls is minimized by virtue of allowing minimal mixing of the fuel with an envelope region of oxidizing gas adjacent the chamber walls.

Yet another object of the invention is to provide such a method wherein excess oxidizing gas is present which does not enter the combustion process. This assures that a relatively greater portion of the heat developed during combustion is converted into useful power, that the combustion event has occurred in a net lean condition, that contact and condensation of fuel on the walls is minimized, and that there exists a heat absorber, i.e., the excess gas, during and after combustion which reduces heat conduction to the cylinder walls. Further, the envelope or layer of air on the cylinder walls reduce the tendency of formation of hot spots on carbon deposits, valve edges or gasket edges during intake and compression, thereby insuring more predictable and more complete ignition and combustion.

Another object of the invention is to provide, in method and apparatus of the class described, a manner for controlling injection of fuel directly into a chamber already filled with oxidizing gas sufficiently precisely relative to initiation of combustion by spark discharge to provide far greater predictability and thus control over the combustion event.

These and other objects of the present invention will become more apparent during the course of the following detailed description.

The invention may best be understood with reference to the accompanying drawings wherein illustrative embodiments are shown.

In the drawings:

FIG. 3 is a sectional view taken along the line 3—3 of FIG. 2;

FIG. 4 is an elevational view partly in section illustrating a modified form of fuel injecting spark plug;

FIG. 5 is an elevational view of a drum structure of modified form; and

FIG. 6 is a sectional view taken along the line 6—6 of FIG. 5.

Figure 1:
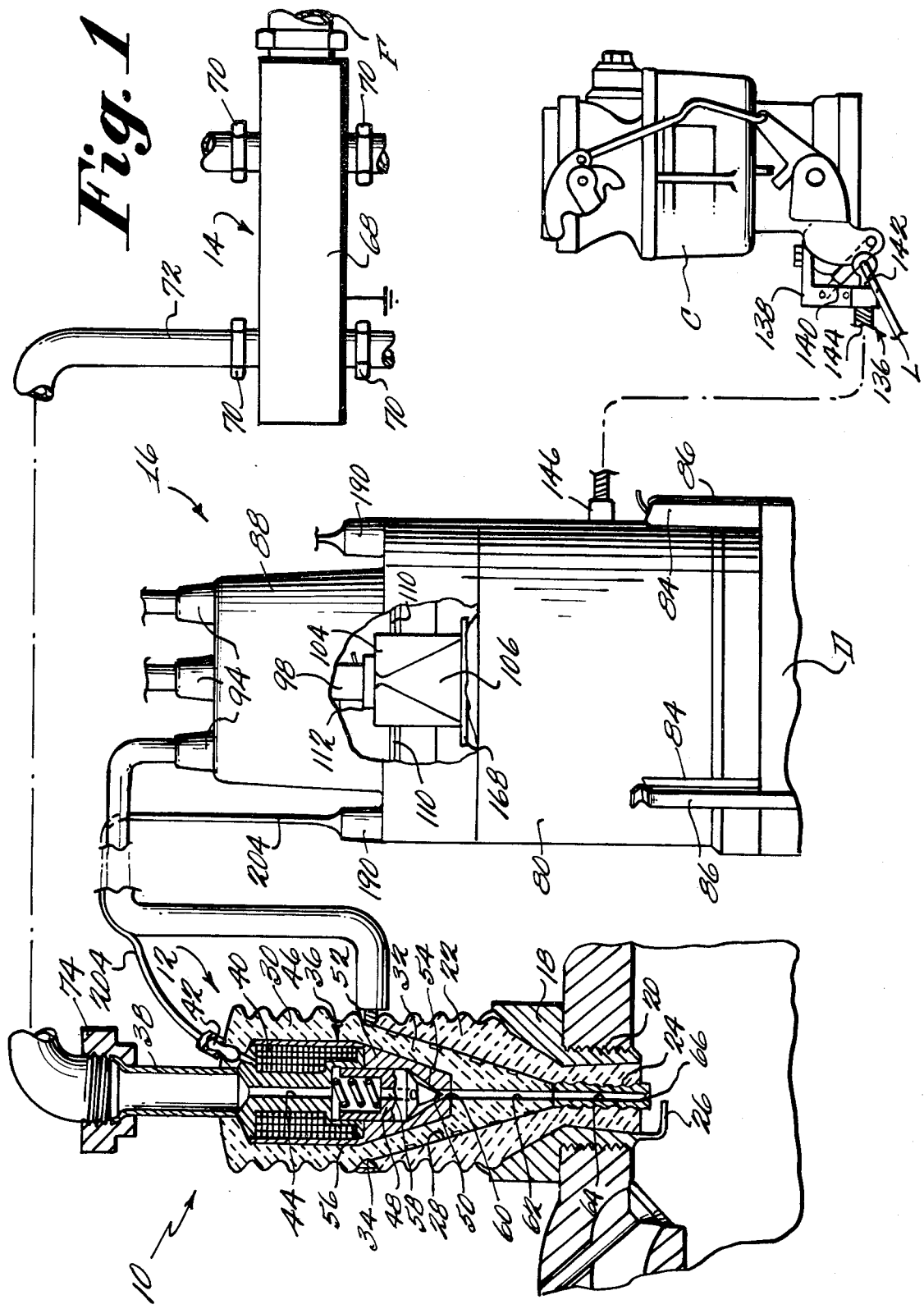
FIG. 1 is a somewhat schematic view illustrating a fuel injection-spark ignition system embodying the principles of the present invention installed as a conversion package on a conventional carbureted-spark ignited internal combustion engine of an automobile.

Referring now more particularly to the drawings, there is shown FIG. 1 thereof a preferred form of fuel injection and the spark ignition system 10 for an internal combustion engine embodying the principles of the present invention. The system of the present invention is applicable to all known internal combustion engines either of the piston and cylinder type or of the rotary type, such as Wankel engines. The system is likewise applicable to engines which operate on the two cycle or four cycle mode. Since the system has particular applicability as a conversion package for a conventional carbureted-spark ignited four cycle, piston and cylinder engine of the type used in most automotive vehicles today, FIG. 1 illustrates such exemplary application including those parts of a typical conventional engine which are effected by the conversion. These parts include a carburetor, indicated at C, having a linkage L of the speed control mechanism and a fuel line F of the fuel circuit connected therewith and a distributor D.

The system 10 includes a series of fuel injection spark plugs, generally indicated at 12, which are installed in the engine in place of the conventional spark plugs, a fuel line manifold or harness 14 having a fluid flow connection with the fuel line F in lieu of its connection with the carburetor C and a similar fluid flow connection with each spark plug 12, and a distributor cap replacement assembly, generally indicated at 16, which is adapted to be mounted on the distributor D in lieu of the conventional distributor cap thereof. The assembly 16 is adapted to be mechanically connected between the distributor rotor and its shaft and has a further mechanical connection with the linkage L of the speed control mechanism in lieu of its connection with the carburetor C. The assembly 16 also provides the conventional electrical connection between the spark igniting signal generating mechanism of the distributor D and the plugs 12 as well as an electrical connection therewith providing a fuel injection electrical signal.

In its broadest aspects, it will be understood that the present system 10 may utilize any known fuel injection spark plug construction. However, in FIG. 1 a preferred form of plug 12 is shown. The plug 12 includes the u ual collar 18 of conductive material, such as metal or the like, the collar providing the usual exterior threads 20 on one portion thereof for engagement with the engine block opening which receives the conventional spark plugs of the engine. Also, the collar 18 includes the usual exterior flats on its outer end portion which cooperate with a wrench or other tool for effecting the securement of the plug 12 in the engine block.

Mounted within the collar 18 is a first annular body 22 of insulative material, the body extending axially outwardly of the collar 18 and being fixedly secured therein by any suitable means, as for example, a swaged down lip on the outer end portion of the collar. The first annular body 22 has fixedly imbedded therein in concentric relation with the collar 18 an electrode member 24, the inner extremity of which is disposed in spaced relation to a ground electrode 26 formed on the inner extremity of the collar 18 so as to provide a spark gap between the two electrodes.

The outer end portion of the first annular body 22 is formed with a cavity or recess 28 extending from the exterior perophery inwardly into communication with the outer end of the electrode member 24. The plug 12 also includes a second annular body 30 of insulative material which is disposed in outward axially extending relation to the first body 22 and includes a projecting portion 32 adapted to engage within the cavity 28 of the first body 22. While this telescoping or male and female relationship between the first and second bodies may assume any particular configuration, as shown, the mating surfaces of the two bodies are of frustoconical configuration.

The two bodies 22 and 30 are arranged so as to be fused together along a portion of the mating frustoconical surfaces thereof with the remaining portion of the surfaces having a conductor 34 disposed therebetween for transmitting the high voltage required to generate the spark across the spark gap provided by the electrodes 24 and 26. In the embodiment shown, the conductor 34 is in the form of a helical strip having an exteriorly exposed annular portion adjacent the juncture of the exterior peripheries of the two bodies 22 and 30 and an inner end suitably connected to the adjacent end of the electrode member 24. It will be understood that the conductor 34 may assume other configurations as, for example, a frustoconical coil suitably apertured throughout to provide surface-to-surface contact permitting the two insulated bodies to be fused together during the assembly of the plug 12, as well as a straight rigid bar.

Preferably, the body 30 is molded in surrounding relation to a solenoid valve assembly, generally indicated at 36. The assembly 36 includes a first tubular member 38 having an outer end portion extending axially outwardly from the annular body 30 and constituting a fuel inlet for the plug 12. The inner end portion of the member 38 is in the form of a spool around which is wound a solenoid coil 40. One end of the solenoid coil is connected with the member 38 which is made of a conductive material and the opposite end thereof extends exteriorly through the spool end flange and the adjacent portion of the insulative body 30 and has an electrical connector 42 secured thereto.

The hub of the spool portion of the member 38 is provided with an axial passage 44 communicating the fuel inlet portion of the member 38 to a recessed opposite end thereof, indicated at 46. Mounted within the recess 46 is a solenoid plunger member 48, the outer end of which is formed into a valve element 50. The member 48 is slidably mounted within a second member 52 having an outer sleeve portion which slidably receives the member 48 defining an annular valve seat 54 therein which cooperates with the valve element 50.

The member 48 is resiliently biased, as by a coil spring 56, into a position wherein the valve element 50 engages the valve seat 54 in closed relation therewith. The exterior periphery of the member may be provided with axial slots or the like which provide for flow of fluid from the passage 44 to the valve seat 54. In addition, as shown, the member 48 includes a central passage 58 which communicates with the exterior of the member at a position spaced from the valve element 50. The member 52 also provides an axial passage 60 leading from the valve seat 54 which in turn communicates with an aligned passage 62 formed in the body 30 and a passage 64 formed in the electrode member 24. The passage 64 terminates in a restricted orifice 66 calibrated so as to prevent flow of fluid outwardly thereof until a predetermined operating pressure condition is obtained.

The fuel manifold 14 may assume many different constructions, as shown, the manifold comprises a simple hollow elongated body 68 having an inlet connection at one end thereof for receiving the outlet end of the fuel line F disconnected from the carburetor C. The hollow body includes a plurality of outlet connections 70 of a number equal to the number of plugs 12 utilized in the system. In the embodiment shown in FIG. 4, an exemplary number of four outlets 70 is provided, each being connected as by a conduit 72 to the inlet portion 38 of a plug 12 as by a connecting net 74 or the like.

Figure 2:
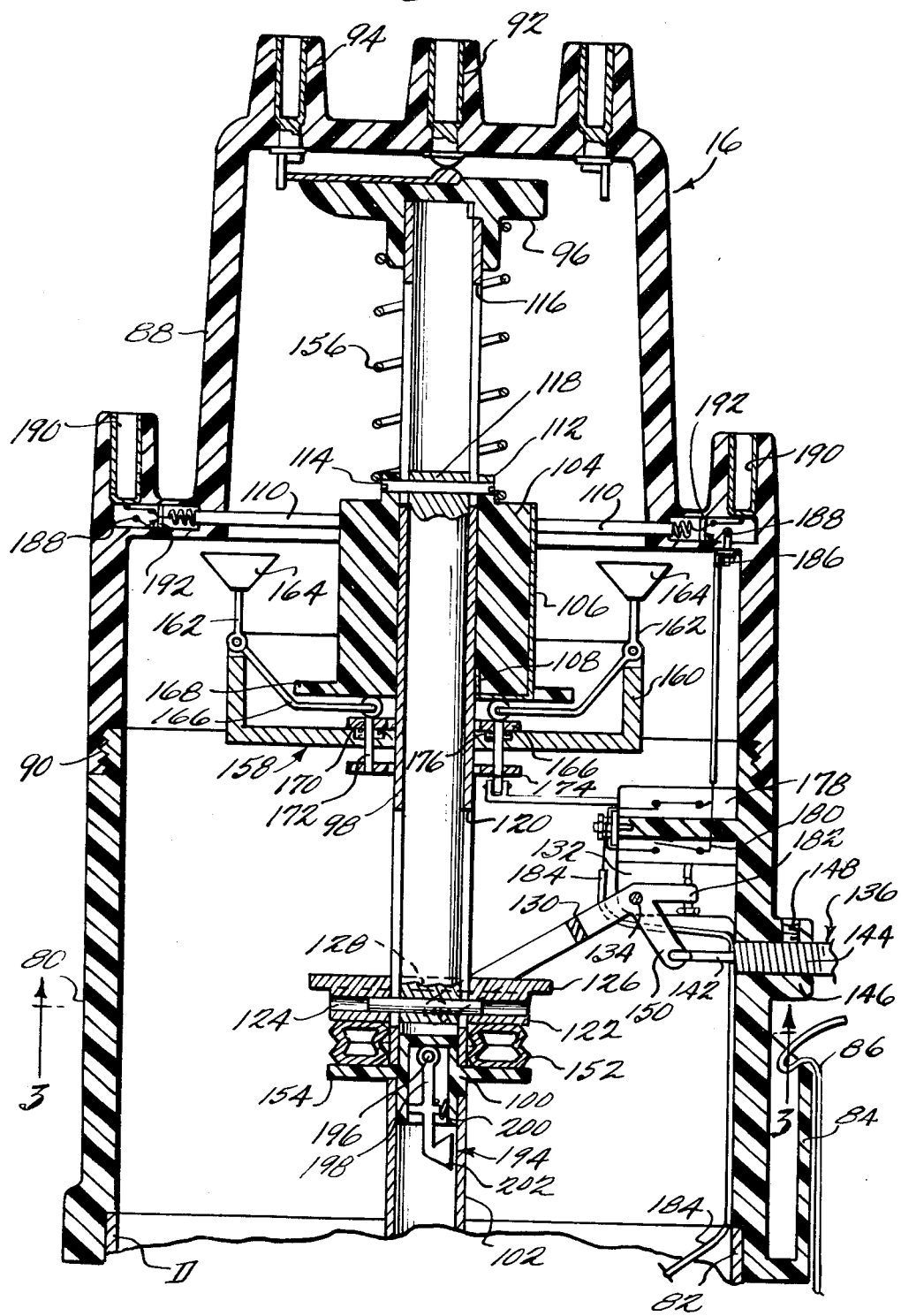
FIG. 2 is an enlarged vertical sectional view of a preferred embodiment of a distributor unit of the present system.

Referring now more particularly to FIG. 2, there is shown therein a preferred embodiment of the distributor assembly 16 mounted on the distributor D in place of the conventional distributor cap thereof. As shown, the assembly 16 includes a housing or distributor cap assembly including a lower adaptor section 80 having its lower end configured to engage the upper rim 82 of the distributor D in the same fashion as the normal distributor cap. In this regard, the adaptor section 80 includes lugs 84 for receiving the usual spring clips 86 which serve to detachably mount the conventional distributor cap onto the metal housing thereof. The housing assembly also includes an upper section 88 which is detachably mounted on the lower section 80, by any suitable means, such as a threaded connection 90 or the like. The upper section includes the usual central terminal 92 to which a lead from the coil is connected and a plurality of circumferentially spaced spark plug terminals 94. These terminals 92 and 94 are adapted to cooperate with a rotor 96 in the same manner as a conventional distributor. The assembly 16 includes a main hollow shaft section 98 having an adaptor 100 fixed to the lower end thereof which is configured to engage the upper end of the conventional rotor shaft 102 of the distributor D. The upper end of the main shaft section 98 configured to detachably receive the rotor 96 on the usual fashion. It can thus be seen that the distributor assembly 16 of the present invention provides the same capabilities built into the conventional distributor insofar as the timing of the spark ignition is concerned.

In accordance with the principles of the present invention, a drum structure 104 is mounted over the shaft 98 for axial sliding movement with respect thereto and for rotational movement therewith. The drum 104 is preferably made of a plastic material and has embedded in the exterior periphery thereof a conductor sheet 106 having a generally wedge-shaped configuration as best shown in FIG. 1. The conductor sheet is electrically connected with the shaft 98, as indicated at 108, in FIG. 2 to provide a ground circuit therefor, as will be hereinafter more fully explained.

This conductor sheet 106 is adapted to cooperate with a plurality of radially extending electric contact brushes 110 and the cap section 88 carrying the same constitute a structure which is disposed in physically cooperating relation with the drum structure 104 for rotational movement of one with respect to the other and for relative movement with respect to each other between first and second positions. Both the relative rotational movement and the relative movement between the first and second positions in the preferred embodiment shown is accomplished by the aforesaid axial and rotational movement of the drum structure 104.

While any suitable arrangement may be utilized to provide these movements, in the preferred embodiment shown, the drum structure 104 is formed with an axial flange 112 on its upper end through which a radial pin 114 extends. The pin 114 also engages within a pair of diametrically opposed axially extending slots 116 formed in the main hollow shaft 98 and a transverse bore within the upper end of a motion transmitting shaft or element 118, the lower end of which extends through the hollow shaft 98 to a position below the drum structure 104. The main shaft 98 is formed with a second pair of axially elongated slots 120 at a position adjacent the lower end portion of the motion transmitting shaft 118 and a collar 122 is slidably mounted in surrounding relation with the exterior of the main shaft 98 adjacent the lower extremity of shaft 118. A pin 124 similar to pin 114, extends radially through the collar 122, within the slots 120 and an appropriate bore in the adjacent lower end portion of the motion transmitting shaft 118.

With the above arrangement, it can be seen that the drum structure 104 will at all times rotate with the rotation of the rotor shaft 102 of the distributor D. The collar 122 provides a means whereby the drum structure 104 may be moved axially along the main shaft 98 during such rotation. This axial movement is effected as a function of the movement of the speed control mechanism of the automobile. To this end, the collar 122 includes an upper radially outwardly extending flange 126, the lower surface of which is adapted to be engaged by a pair of rollers 128 carried by the outer ends of a fork member 130. The fork member 130 is pivotally mounted on a lug structure 132 formed integrally on the interior of the lower cap section 80 at a position indicated at 134 in FIG. 2.

The motion of the speed control mechanism of the automobile is transmitted to the fork member 130 preferably by a conventional Bowden wire assembly, indicated generally at 136. With reference to FIG. 1, a bracket 138 is suitably mounted on the carburetor C and the normal throttle and choke mechanism of the carburetor is suitably locked into an open position as by any suitable means such as the turn-buckle link 140 illustrated in FIG. 1 extending between the bracket 138 and the throttle and choke mechanism. The connecting rod of the speed control linkage L is disconnected from the throttle and choke mechanism and connected to one end of a shaft 142 of the Bowden wire assembly 136. The Bowden wire assembly includes the usual flexible casing 144, the adjacent end of which is fixed to the bracket 138. The opposite end of the casing 144 is engaged within an apertured boss 146 formed in the lower cap section 80 and suitably fixed thereto by any suitable means, such as a set screw 148 or the like.

In the preferred embodiment shown in FIG. 2, the connection between the fork member 130 and collar 122 is a one-way connection by virtue of the provision of only a single upper flange 126. While it will be appreciated that it is within the contemplation of the present invention to provide a two-way lost motion connection between the fork member 130 and the collar 122 by utilizing a lower annular flange on the collar, the one-way connection shown is preferred because it provides for a smoother operation as will become more apparent hereinafter.

As can be seen from FIG. 2, in the normal idle position of the speed control mechanism, the rollers 128 of the fork member 130 are disposed slightly below the flange 126. This slight lost motion is provided for the purpose of limiting the idle position of the collar 122 by a pressure and temperature compensating means in the form of an annular bellows 152. As shown, the adapter 100 includes an annular flange 154 extending radially outwardly therefrom and the annular bellows 152 is mounted between the annular flange 154 and the collar 122. The annular bellows thus serves as a limiting stop for the collar 122 which is both pressure and temperature sensitive.

The collar 122, shaft element 118 and drum structure 104 are resiliently biased into an idle position by a coil spring 156 surrounding the upper end portion of the main hollow shaft 98 and having its lower end engaged over the drum collar 112 and its upper end engaged over the attaching collar of the rotor 96. It can be seen that the return or downward axial movement of the drum 104 is effected by the spring 156. The force of this spring is calibrated to effect a controlled return movement of the drum in conjunction with the operation of a centrifugal retarding mechanism, generally indicated at 158. This mechanism includes a rotary member 160 of generally cupshaped configuration fixedly secured to the exterior periphery of the main shaft 98 by any suitable means, such as welding or the like. Carried by the upper outer periphery of the member 160 at equal annularly spaced positions therearound is a plurality of pivoted levers 162 having weights 164 formed on one end thereof and rollers 166 journaled on the inner ends thereof. The upper surface of each of the rollers 166 is adapted to engage a lower flange 168 formed on the drum structure 104 and the lower surfaces thereof are adapted to engage the upper surface of a ring 170. The ring 170 has a plurality of annularly spaced pins extending downwardly therefrom through the member 160, the lower ends of the pins being in turn fixed within a lower ring 174. The two rings interconnected by the pins 172 are resiliently biased into an upper limiting position by a series of light springs 176 surrounding the pins 172 in a position between the upper ring 170 and the adjacent portion of the member 160.

The dual ring assembly provides a means for electrically sensing when the drum structure 104 is disposed within or adjacent to its idle position. To this end, there is provided a switch 178 having an arm mounted in a position to be engaged by the lower ring 174 when the drum structure 104 reaches a position closely adjacent its idle position. The switch 178 is adapted to be closed when the drum structure 104 is in its idle position or in any position closely adjacent thereto. This switch is connected in parallel with a switch 180 which is of the normally closed type adapted to be opened in response to movement of the speed control mechanism into a position adjacent its idle position. To this end, the fork member 130 is provided with a third actuating arm 182 which is disposed in a position to engage the plunger of the switch 180 and maintain the same in open condition when the speed control mechanism is either in its idle position or any position closely adjacent thereto.

As shown in FIG. 2, one side of the switches 178 and 180 is connected in parallel by a lead wire 184. The opposite end of the lead wire 184 is adapted to be connected in the circuit to the condensor and braker points of the distributor D at a position on the positive side of the condensor. The other poles of the switches 178 and 180 are connected in parallel with a lead terminal 186 which is connected to a circular conductor 188 mounted in the upper cap section 88. Connected between the circular conductor 188, each brush 110 and an associated terminal 190 is a transistor 192. Each transistor is connected so that the emitter is connected with the circular conductor 188, the collector is connected with the associated terminal 190 and the base is connected with the associated brush 110. Each transistor thus serves to complete a low voltage circuit to the associated terminal 190 when the associated brush 110 is grounded.

The grounding of each brush 110 is accomplished by the conductor sheet 106 on the drum structure 104 when the latter contacts the brush during the rotation of the drum structure 104. The ground circuit from the conductor sheet 106 is completed through the shaft 98 and to the distributor shaft 102 by a centrifugal switch assembly, generally indicated at 194. As shown, the switch assembly 194 includes a conductor shaft 196 which extends through the lower end of the shaft 198 and through the upper end of the adapter 100. The adapter is made of a suitable insulative material, such as plastic or the like, and is formed with a hollow interior within which a pendant conductor arm 198 is disposed. The conductor arm is connected with the shaft 196 and is biased into an open position, as by a spring 200 or the like. The arm includes an eccentric, weighted contact portion 202 which, when the shaft 102 is turned even at starter speeds moves out by centrifugal action into contact with the interior of the shaft 102 overcoming the bias of spring 200. Each terminal 190 is connected to the coil terminal 42 of an associated plug 12 by an appropriate lead 204.

OPERATION

It is believed apparent from the above description just how the component parts of the present system are mounted on a conventional automobile to convert the same to a fuel injection system. To briefly re-state these operations, the spark plugs of the conventional engine are replaced by a set of plugs 12, the fuel line F to the carburetor C is disconnected and connected to the fuel manifold 14. Each outlet 70 of the fuel manifold 14 is connected to the fuel inlet 38 of an associated plug 12 as by a line 62. Next, the linkage L of the speed control mechanism is disconnected from the throttle and choke mechanism of the carburetor C and this latter mechanism is locked into its fully open position by the turnbuckle 140 connected to bracket 138. The linkage L is then connected to one end of the Bowden wire assembly 136. Finally, the distributor cap of the engine is removed and replaced by the distributor assembly 16 of the present system. In this regard, it is assumed that the other end of the Bowden wire assembly 136 is connected to the fork member 130 and specifically the arm 150 thereof in the manner as shown in FIG. 2. Moreover, the lead wire 184 must initially be connected to the positive side of the condensor in the point circuit of the distributor D. In mounting the distributor assembly 16 on the distributor D, the adaptor 100 is engaged on the upper end of the output shaft 102 of the distributor in the same fashion as the conventional rotor. The spark ignition terminals 92 and 94 are connected respectively to the coil and plugs 12 in the usual fashion and the terminals 190 are connected to the coil terminals 42 of the plugs as by lines 204. By this simple interconnection, the present system renders a conventional carbureted spark-ignited engine capable of operating in a fuel injection-spark ignition mode.

The operation of the system 10 can best be explained in relation to the normal operation of an automobile. In this regard, it will be noted that since the fuel solenoid valve assemblies are connected in parallel with the spark ignition circuit, the latter will be under the control of the ignition key. When the operator turns on the key, the starter circuit is energized, causing a rotation of the engine which rotation moves the centrifugal switch assembly 194 into contact with the interior of the hollow distributor shaft 102 permitting the circuit through the conductor sheet 106 of the drum structure 104 to be completed. It will be noted that the drum structure 104 at start-up is disposed in its idle position as shown in FIG. 2, so that switch 178 is closed completing the circuit to the circular contact 188. As the drum structure 104 is rotated with the distributor shaft 102, the conductor sheet 106 will move into successive electrical contact with the brushes 110. This actuates the associated transistor completing the circuit to the associated terminal 190 and therefore through the coil 40 of the associated plug 12. The energization of the coil 40 draws the plunger member 48 upwardly, as shown in FIG. 1, against the normal bias of spring 56, moving the valve element 50 away form the seat 54, permitting fuel in the manifold assembly 14 to flow outwardly through passages 60, 62, 64 and restricted orifice 66 into the associated combustion chamber of the engine. The ignition signal is accomplished in the usual fashion through rotor 96 and the braker contact circuit of the conventional distributor D. In this way the plug 12 associated with each combustion chamber has a charge of fuel discharged therein and ignited by the spark during each cycle of operation.

Where the automobile has been standing in a cold environment or in a low-pressure environment prior to start-up, the bellows 152 will be contracted from the position shown in FIG. 2, thus causing the drum structure 104 to assume an idle position slightly below that illustrated in FIG. 2. As shown in FIG. 1, the conductor sheet 106 includes a diverging portion adjacent the apex position thereof at the upper end of the drum structure, thus providing for a fuel injection signal of a time duration slightly greater than the time duration at the normal idle position. Thus, the pressure and temperature sensitive annular bellows 152 serves as the equivalent of a choke and enables the system to provide for a greater idle speed than normally would be the case under low temperature and/or low pressure conditions. As soon as the engine has warmed up sufficiently, the bellows 152 will expand and thus limit the idle position of the drum structure 104 to the normal position shown in FIG. 2.

As the operator steps on the accelerator pedal and moves the same from its normal idle position toward it maximum acceleration position, this motion is transmitted through the linkage L and Bowden wire assembly 136 to the yoke member 130 which in turn moves collar 122 and hence drum structure 104 upwardly from the position shown in FIG. 2. This upward movement of the drum structure serves to increase the width of the contact strip 106 engaged by the brushes 110 during each revolution of the drum structure. This variation in turn serves to increase the time during which the coil 40 is energized and hence the amount of fuel discharged into each combustion chamber. Consequently, the engine speed will increase in response to the movement of the accelerator pedal toward its maximum acceleration position. The position of the leading edge of the conductor sheet provides an advance for the fuel injection signal, and in addition, the normal advance of the distributor shaft 102 is likewise utilized.

It will be noted that the movement of the yoke member 130 beyond a position slightly adjacent to the idle position shown will serve to close the switch 180 and as the speed of the engine increases beyond the idle speed, the weighted arms 162 of the centrifugal retarding assembly 158 will pivot about their axes so that the associated rollers 166 are moved in an upward direction generally following the upward movement of the drum structure 104. After a small predetermined amount of the movement, switch 178 is opened but since switch 180 has been previously closed, the circuit to the brushes 110 is continuously available. It can thus be seen that so long as the operator is moving the accelerator pedal in a direction toward maximum acceleration or maintaining the accelerator in any position to which it has been moved, the drum structure 104 will simply assume a corresponding position which determines the time of the fuel injection signal and hence the speed of the vehicle. This relationship in the preferred embodiment shown does not hold true, however, with respect to the movement of the accelerator pedal in a direction toward its idle position. When the operator rapidly releases his foot from the accelerator pedal, the yoke member 130 immediately returns to its idle position, thus opening switch 180. This has the effect of interrupting the circuit to the circular conductor 188 and hence no fuel injection signal will be transmitted to the plugs. In this way, a deceleration of the automobile will be effected with the engine being moved through its operation as a pump until the speed thereof slows down to a value adjacent idle speed, at which point switch 178 is closed, thus re-energizing the circuit to the fuel injection solenoids.

It will be noted that as the engine speed is reduced during the above-described operation, the movement of the drum downwardly is controlled by the centrifugal retarding assembly 158. Thus, as soon as the fork member 130 is moved into its idle position spring 156 adds its bias onto the drum structure 104, moving the latter downwardly. However, the calibration of the spring is such that this movement will be resisted by the position of the weights 164. As the speed is reduced the weights permit the spring to bias the drum structure downwardly until it reaches the position sufficient to close switch 178. In the event that the operator should engage the accelerator pedal before the engine speed reaches a value sufficient to close the switch 178, the movement of the accelerator pedal will permit re-energization of the fuel injection circuit by closing the switch 180. The retarding mechanism insures that when the switch 180 is closed, the initial signal transmitted to the plugs 12 will be at a value nearly that desired for the speed at which the engine is then operating. In this way a smoother operation is insured.

It will be appreciated that the operation of the present system will require a little getting used to by the operator. In any situation where the operator desires to bring the vehicle to a stop, the operator is required to release his foot from the accelerator pedal and the cut-off feature of the present system will materially aid in bring the vehicle to the desired stop. The arrangement clearly conserves fuel and by the same token reduces pollution. As the engine speed approaches idle speed injection is automatically resumed at the desired idle speed. On the other hand, where it is desired to diminish the speed, as in cruising, the operator need only let off his foot slightly from the accelerator pedal and the speed retarding mechanism will provide a controlled retarding of the speed. Thus, a smooth cruising operation is insured.

Perhaps one of the greatest advantages of the present system is that it renders the automobile capable of operating on low octane gasoline and numerous other fuels. The system is essentially independent of variations in the manifold fuel pressure produced by the conventional fuel pump of the automobile, in that variations in the fuel pressure will be reflected equally in all of the cylinders so that the only compensation required by the operator is to vary the position of the accelerator pedal for a given desired speed in the event of a variation in fuel pressure. By injecting the fuel directly into the combustion chamber, the cut-off feature is made possible even with liquid fuels, since instantaneous response is possible. Where gasoline fuel injection occurs in the manifold, such instantaneous action can not be achieved, due to the wetting and drying of the manifold walls by the fuel. Moreover, by injecting the fuel directly into the combustion chamber, a more accurate timing of the fuel injection can be maintained, thus eliminating the need for high octane, and indeed rendering the present system capable of operating on all well-known fuels such as diesel fuel, methane, propane, heated kerosene and the like. The present system lends itself readily to a dual fuel capability as well. That is, a system which has the capability of alternately operating on any one of two or more different fuels.

It will be understood that while the simple conductor sheet and brush means for generating the electrical signal for effecting the fuel injection is preferred, the present system lends itself to other electric signal generating means. Such alternative means may include a primary transformer in the drum assembly, a magneto in the drum assembly or even a phototransistor in the drum assembly.

It will also be understood that while all of the above arrangements including the conductor sheet and brush arrangement vary the characteristic of the electric fuel injection signal in terms of time, the present system also contemplates varying other characteristics of the electrical signal. For example, in FIGS. 4–6, there is shown components of a modified system in which the characteristic of the electrical fuel injection signal which is varied is the voltage of the signal, the variation in the voltage being utilized to vary the amount of fuel injected.

FIG. 4 illustrates the modifications in the fuel injection spark plug 12 necessary to make the plug responsive to an electrical signal which varies in voltage. The plug illustrated in FIG. 4 is identical with the plug 12 previously described except that the valve assembly 36 of the plug 12 is replaced by a different valve assembly, indicated generally at 206. Since the plug is the same except for this difference a description of the remaining structure of the plug is deemed unnecessary and corresponding reference numerals have been applied to FIG. 4. The assembly 206 includes an inlet tube portion 208 similar to the portion 38 previously described and an inner casing portion 210 having valve seat member 212 of electrical insulative material carried by the inner end portion thereof. Fixed to the junction between the inner and outer portions 208 and 210 is the outer end of a valve member 214 made of a piezoelectric material. The valve member 214 extends inwardly toward the valve seat member 212 and has a valve surface 216 formed on the inner end thereof which is normally disposed in closing engagement with the valve seat.

As before, the valve member 214 may include an axial passage 218 extending inwardly from the outer end thereof which communicates exteriorly of the member at a position spaced outwardly of the valve surface 216 thereof. The exterior periphery of the body 30 has a lead 220 extending annularly thereabout and radially therethrough and through the adjacent portion of the casing 210, the lead being electrically connected to the inner end of the valve member 214. The valve member 214 may be of any conventional piezoelectric material of the type which will contract in length in response to the transmission of a high voltage current therethrough, as by a circuit from the lead 220 to ground through the inlet tube 208, with the amount of contraction being proportional to the voltage of the electrical signal transmitted thereto.

FIGS. 5 and 6 illustrate a drum structure, generally indicated at 222, for generating the variable voltage signal to which the valve assembly 206 is responsive. It will be understood that this drum structure 222 can be simply substituted in lieu of the drum structure 104 previously described. As best shown in FIG. 6, the drum structure 222 includes a core 224 of conductive material, such as metal or the like, having an axially bore therein for receiving the shaft section 98. This core includes an axially extending slot 226 which varies in depth throughout its axial extent. Mounted within the slot 226 is a variable thickness resistor 228 which is made of any conventional resistor material. The outer surface of the resistor 228 extends beyond the outer periphery of the core 224 in flush relation to the outer cylinderical surface of a cover 230 made of electrical insulative material, such as plastic or the like.

It will be understood that the axial movement of the drum from an idle position toward a maximum acceleration will result in a decreasing of the resistance of the circuit through the variable resistor 228 and hence an increasing voltage in the piezoelectric valve member 214. Since the valve member 214 contracts an amount which increases proportional to the increase in the voltage the amount of fuel discharged increases due to the greater flow passage through the valve seat or lesser resistance to flow therethrough. It will be understood that the electrical characteristics of the transistor 192 utilized in the circuit for transmitting the variable voltage signals to the valve members 214 may be appropriately modified from those used in connection with the preferred embodiment of FIGS. 1-3 to enable the transmission of the high voltages required to effect contraction of the piezoelectric material of the valve members 214. If necessary amplifiers may be embodied in each transistor circuit.

It can thus be seen that there has been provided a system which is simple in structure and operation. This simplicity is obtained by the basic provision of two physically cooperating structures mounted so that one rotates with respect to the other and so that a relative movement with respect to each other between limiting position can take place during such rotation. It will be noted that in the preferred embodiment shown, one of the structures is a ganged structure suitable to accommodate a plurality of combustion chamber of the piston and cylinder type. It is preferrable that the ganged structure be generally stationarily mounted and that the rotating structure be moved axially to accomplish the relative movement as exemplified by the preferred embodiments shown in the drawings and described above. In its broader aspects however, the present invention contemplates movement of the ganged structure so long as the principles of the invention are adhered to.

Figure 7:
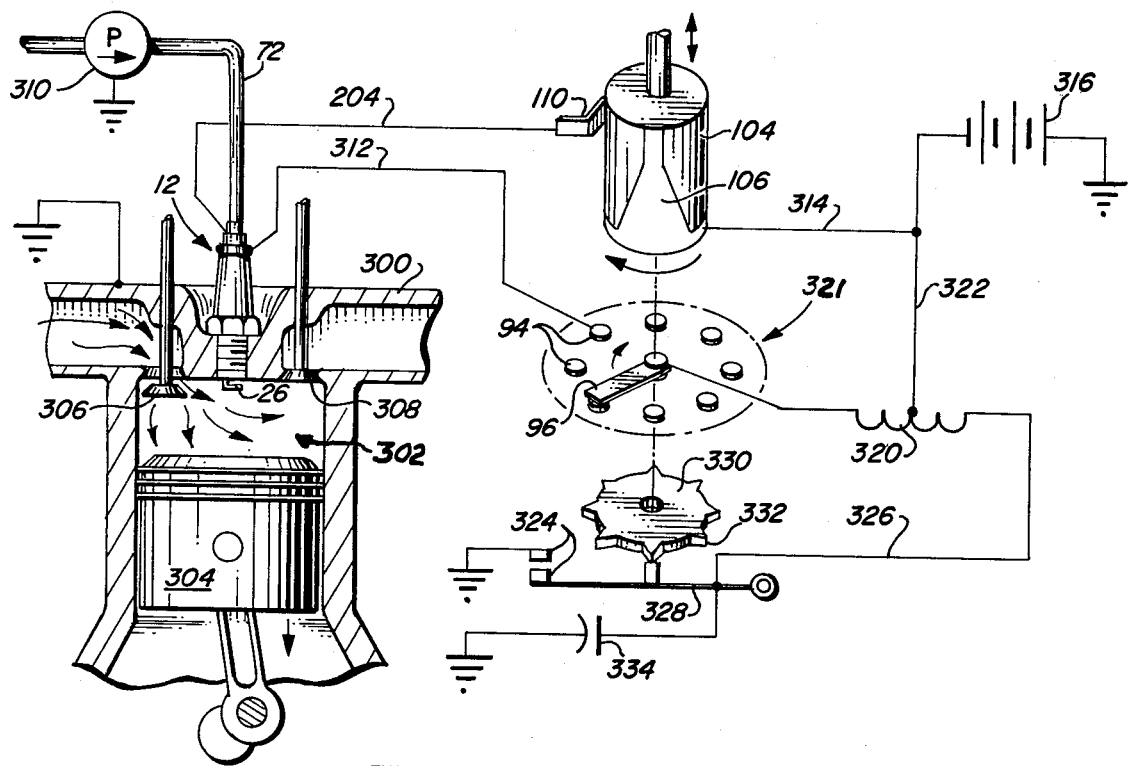
FIG. 7 is a partial cross-sectional view of one cylinder of an internal combustion engine during its intake stroke, and schematic representation of the fuel injection system and a conventional spark ignition system.

Referring now to FIG. 7, the fuel injection spark plug 12 of FIG. 1 is shown assembled with its lower end disposed within a cylinder chamber 302 of an engine 300. A reciprocating piston 304 in chamber 302 is on its downward intake stroke causing increase in the volume of the chamber. The intake valve 306 is open, exhaust valve 308 closed, and oxidizing gas, e.g., air, is being drawn into the chamber. Minimum obstruction to this air flow is present since no carburetion is being used. FIG. 7 also schematically depicts the fuel conduit 72 connecting plug 12 with a means for pressurizing fuel 310, and leads 204 and 312 respectively connecting the plug with contact brush 110 and spark plug terminal 94. Conductor sheet 106 on drum structure 104 is interconnected by lead 314 with electrical battery 316, and distributor rotor 96 is connected by lead 318 with the secondary winding of ignition coil 320. The conventioanl "Kittering" type ignition circuit 321 illustrated has a connection 322 between the battery and the coil 320, while the primary winding of the coil connects with the distributor points 324 via lead 326 and conductive cam follower arm 328. Arm 328 follows a cam 330 rotating with rotor 96 and drum 104 to cause timed breaking of points 324 upon engagement with a lobe 332, and consequent high rate of change of current in the primary coil winding to induce a high voltage in the secondary to cause an electrical arc discharge at the spark plug electrode 26. A condensor 334 is included to filter arcing across points 324 to increase their life.

The method of operation of one cylinder of the engine is depicted in FIGS. 7 - 11, it being understood that the other cylinders operate identically and sequentially. During the full intake stroke, air or other oxidizing gas and working medium is drawn past inlet valve 306 into chamber 302 to fill the latter completely. Brush 110 is not in contact with conductor 106, and rotor 96 has not yet made contact with the proper terminal 94. Thus, no fuel is being delivered through plug 12, and electrical arc discharge has not occurred. Upon subsequent compression operation, piston 304 moves upwardly reducing the volume of chamber 302 and compressing the air therein.

Figure 8:
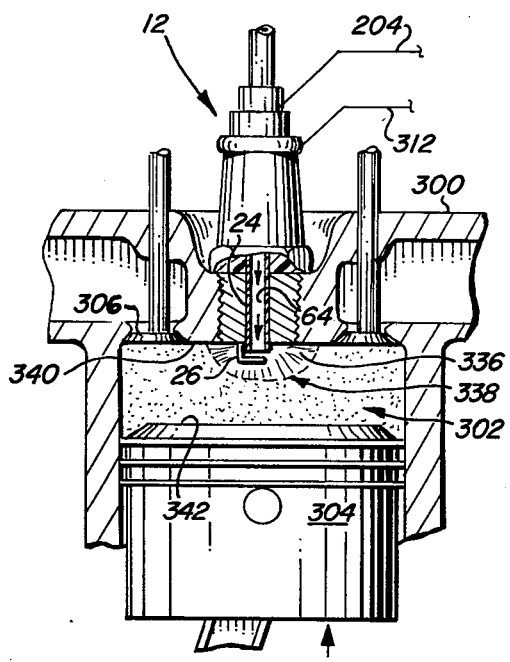
FIG. 8 is a view of the engine cylinder similar to FIG. 7 but showing fuel injection during compression stroke.
Figure 9:
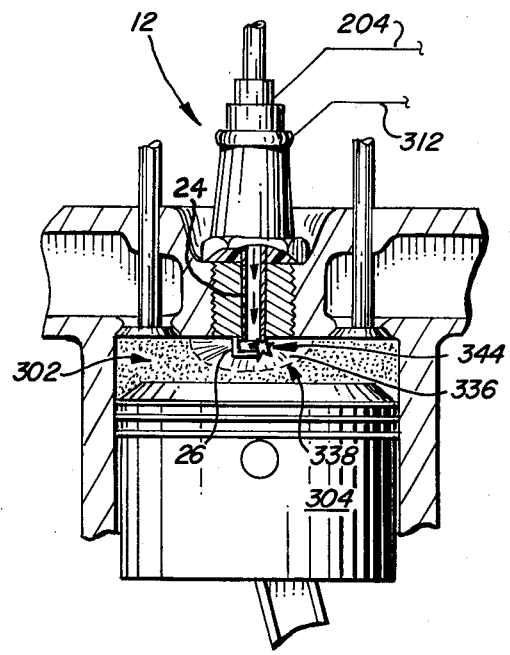
FIG. 9 is a view similar to FIG. 8 but showing conditions at initiation of ignition.

Prior to the end of the upward compression stroke where chamber 302 is at its minimum volume, a position referred to herein as top dead center, lead 204 becomes energized by contact between brush 110 and conductor 106 so that the solenoid valve opens and fuel is delivered under pressure into chamber 302 as shown in FIG. 8. The fuel spray out of passage 64 mixes with air adjacent the spark plug to create a region 336, the limits of which are schematically illustrated by dashed line 338, containing relatively rich proportions of fuel. The remaining portion of chamber 302 and particularly the zone adjacent the chamber walls (including the cylindrical side walls as well as the chamber top wall 340 and piston top wall 342) is a relatively lean zone substantially devoid of fuel. The size of region 336 increases as fuel is being delivered; however the momentum of the air being forced upwardly by the piston reduces the speed of propagation of the fuel rich zone in a direction toward piston 304. Thus, zone 336 tends to flatten out as it grows in size, and an envelope or layer of fuel lean mixture remains to separate piston face 342 from zone 336. It is important to note that the electrical discharge path extending between electrodes 26 and 24 is disposed in zone 336.

As the piston nears top dead center (FIG. 9), lead 312 energized by the ignition circuit to create an electrical spark discharge 344 between the electrodes 24 and 26 and within zone 336. Lead 204 is still being energized and fuel being delivered into the combustion chamber. Combustion begins upon occurrence of the spark discharge, and the resulting flame front rapidly propagates through zone 336 at a faster rate than the speed at which the size of zone 336 is increasing, i.e., the speed of movement of hypothetical dashed line 338. Occurrence of spark discharge while fuel is still being admitted assures that the spark occurs in a fuel rich zone relatively centrally located in the chamber 302.

Figure 10:
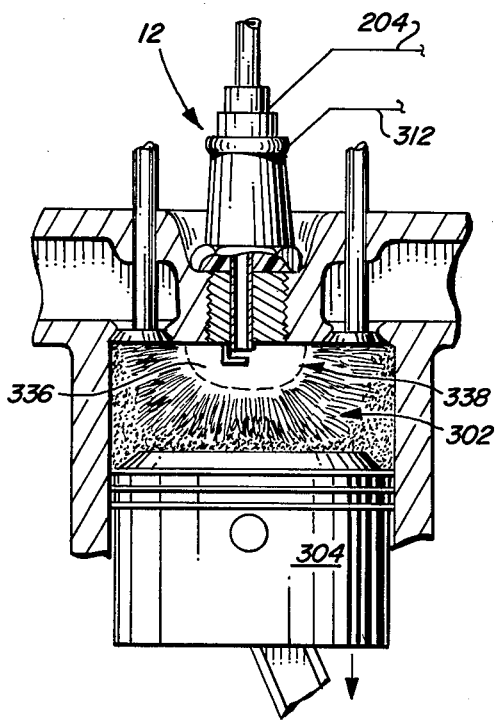
FIG. 10 is a view similar to FIG. 8 but showing combustion during the power stroke.
Figure 11:
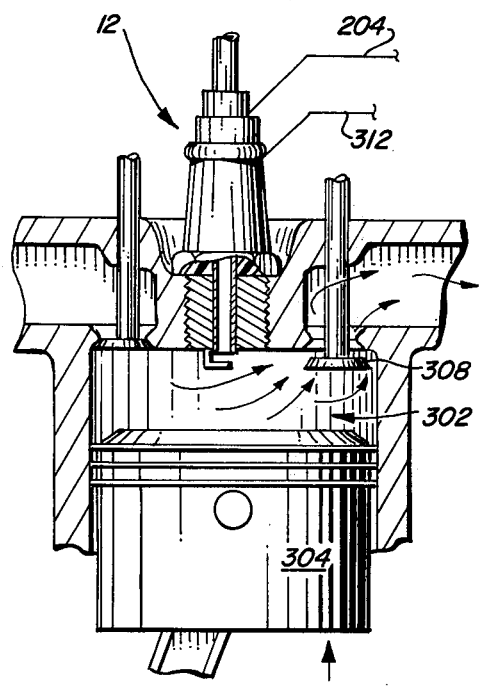
FIG. 11 is a view similar to FIG. 8 but showing the exhaust stroke.

Heat generated by combustion is transmitted directly to the working fluid, which in an air breathing engine is the intake air that also supplies the need oxidant to sustain combustion. The working fluid consequently expands to drive piston 304 downwardly to perform useful work as shown in FIG. 10. Fuel flow into the chamber terminates shortly after ignition by the timed de-energization of lead 204 as conductor sheet 106 passes out of contact with brush 110. The combustion continues after the end of fuel injection, spreading outwardly from the general center of chamber 302 toward its walls, until the flame front overtakes the outer periphery 338 of the fuel penetration zone. Once the flame front overtakes the regions in the chamber containing sufficient fuel for combustion, the combustion is continued using as fuel the heated products of the initial fuel rich combustion and as an oxidant, the envelope of air substantially devoid of fuel near the chamber walls. Accordingly, substantial amount of the working fluid and oxidant carrier (air) does not enter the combustion process. After completion of the power stroke, the piston 304 returns upwardly to force the products of combustion and the excess air outwardly through opened exhaust valve 308 as shown in FIG. 11.

Timing of fuel injection relative to occurrence of initiation of combustion by spark discharge provides relatively direct control of the combustion event in the above-described method. Variation of the amount of fuel injected controls the power generated and operation of the engine. Initiation of combustion is well controlled since the spark discharge occurs along a path in the fuel rich zone 336. Consequently the condition of the fuel-air mixture at the location of spark can well be controlled by the relative timing of fuel injection and the spark, especially when occurrence of spark while fuel is being injected assures that the fuel-air mixture is precisely controlled at the time and location of ignition. Thus, the control over initiation of the combustion event offered by the present invention is far more precise and reliable than offered by prior engine kinetic controls wherein control substantially ended long prior to start of ignition.

Similarly, the condition of fuel-air mixture in the remainder of the chamber 302 is so precisely controlled that the invention offers far greater control over the remainder of the combustion event following ignition. The timing of spark relative to fuel injection establishes the extent of growth of the fuel rich zone such that the speed of the combustion event can consume substantially all the fuel prior to being quenched upon reaching the envelope of substantially fuel-free air near the periphery of the chamber. Accordingly, the invention and its method of allowing mixing of fuel and air while combustion is occurring rather than pre-mixing throughout the chamber, allows control of the location of combustion and rate of burn of the fuel throughout the combustion event. Further, the relative timing of fuel injection to spark discharge determines the richness of the fuel-air mixture throughout the region where combustion occurs to provide substantially complete control over combustion.

Prior attempts at providing a stratified charge engine utilized substantial mixing of the fuel and air throughout the cylinder chamber prior to ignition. This mixing action often prevented complete burnout of the fuel delivered into the chamber. By mixing the fuel and air sufficiently it was assured that substantially the entire combustion chamber contained a mixture rich enough in fuel to support a combustion event that, in volume, utilized the entire chamber area. As mentioned before, such mixing action tended to induce rather than inhibit fuel exposure to the chamber walls and the consequent drawbacks associated with fuel layering.

In contrast to these prior art stratified charge engines, the present method and apparatus precisely controls the mixing action relative to initiation of combustion to contain the combustion event in a volume somewhat less than the entire volume of the cylinder chamber, and to provide the insulating layer of air that is substantially devoid of fuel near the chamber walls. Thus, air surrounded burnout of the combustion event is utilized to improve engine performance. At the same time, the precise control over combustion can assure that substantially all the fuel is consumed even though quenching in an envelope of air occurs.

Control over the combustion event and engine performance and operation is a function of the timing of the fuel injection signal. In the embodiment illustrated, accurate control over fuel injection is provided by the shape of the conductor sheet 110, resistor 228 or equivalent signal generator which energizes the solenoid valve. In the preferred embodiment an on-off type valve is used, the amount of time the solenoid is actuated and "on" determines the volume of fuel delivered and engine operation. In the arrangements illustrated, where the signal generator or map rotates as a function of engine speed, the solenoid on-time is a function of engine speed and the position of the brush 110 or equivalent signal pickup to the signal generator.

The shape of the signal generator or map may be selected either by empirical processes or through theoretical considerations to optimize the desired combustion characteristics. The map geometry may be selected to optimize one or a combination of various input parameters such as power requirements, fuel selection, maximum fuel economy, minimum nitrogen oxide emissions or minimum emissions of other types of pollutants. The map design may be tailored to take into consideration such parameters as engine design (which determines compression ratio, displacement, air intake, combustion chamber geometry and minimum volume) and fuel characteristics (which determines burn rates for different mixtures, heat of combustion and type and volume of pollutants), in order to optimize the desired parameters of engine performance, e.g., engine idle and cruise speed, desired power output, desired pollutant emission levels. It is to be understood, of course, that when optimizing a combination of performance factors such as power and nitrogen oxide emissions, that the performance as to one of these factors is sacrificed to a certain extent in favor of the other factor.

Figure 12:
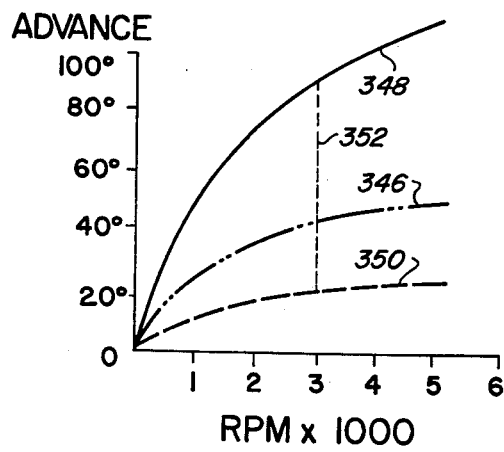
FIG. 12 is a graph illustrating the variation in fuel injection and spark discharge relative to engine speed for a typical four cycle reciprocating internal combustion engine utilizing the present invention.

FIG. 12 is an exemplary graph illustrating the invention incorporated into a conventional, reciprocating four cycle internal combustion engine. The vertical axis depicts increasing advance in the engine, i.e., the number of degrees of crank rotation prior to the piston reaching top dead center in the chamber, while the horizontal axis represents engine rotational speed in revolutions per minute. Curve 346 represents the occurrence of spark discharge. The engine is provided with spark advance to provide sufficient time for complete combustion at higher engine speeds. Thus, at higher RPM the spark occurs at an earlier crank angle position.

The curves 348 and 350 respectively represent the occurrence of initiation and end of the fuel injection signal as determined by the shape of the signal generating map. In the embodiment depicted, it is assumed that the signal generating map disposed in the distributor and rotating therewith, advances along with the spark advance. This is the usual situation in most applications of the invention, since spark advance is accomplished by "advancing" or rotating the portion of the distributor shaft to which the distributor rotor is attached. Being fixed with that portion of the distributor shaft, the signal generating map also "advances" in unison with spark advance. Taking into account this built-in advance, the map is designed such that the advance of curves 350 is somewhat less than curve 346, assuring that fuel is being injected upon spark discharge. Curve 348 illustrates the far greater rate of advance of initiation of the fuel signal so that the vertical distance between curves 348 and 350 varies to provide for acceleration, deceleration, and to take into account the previously mentioned parameters in order to produce the desired engine operational characteristics.

It will be noted that in the type of graph illustrated in FIG. 12, a vertical line such as line 352 depicts relative steady state (i.e. no vehicle acceleration or deceleration) conditions with the engine at 3000 RPM. Manual shifting of the signal pickup relative to the signal generating map, causes the curves 348 and 350 to move in unison along curve 346, and causes either more or less fuel injection on-time and resulting acceleration or deceleration. This action is similar in effect to that of the present engine accelerator, i.e., the operator simply depresses the accelerator a different amount to produce the desired vehicle speed, and engine load, gear ratio, etc are automatically accounted for.

Figure 13:
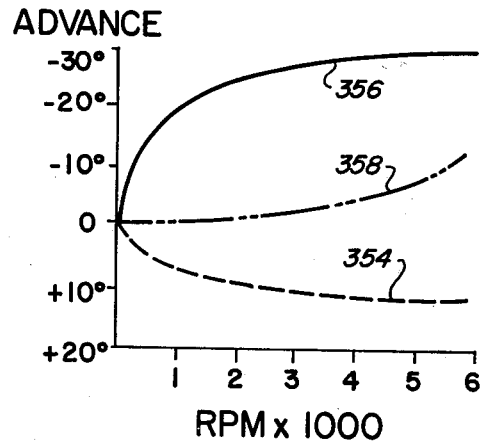
FIG. 13 is a graph similar to FIG. 12 but for a typical rotary type internal combustion engine.

FIG. 13 is the same type of graph but illustrating typical operating conditions for a rotary type engine, such as "Wankel" engine. The vertical axis extends from −30° (30° prior to movement of the rotor member in the engine chamber to its minimum-combustion-chamber-volume position denoted by 0°) to +20°, i.e., 20° after the rotor reaches its minimum combustion-chamber-volume position. In this arrangement it has been found most efficient to create ignition quite near minimum volume position, (0°), and to allow fuel injection even after the rotor is on its downward power stroke at higher rpm steady state conditions as shown by curve 354. Initiation of fuel delivery is shown by curve 358. Thus, FIGS. 12 and 13 illustrate how the fuel injection signal may be varied in relation to radically different engine designs.

In both FIGS. 12 and 13 the fuel injection is timed to occur so as to create maximum brake mean effective pressure and minimum unburned hydrocarbon emissions, and operate on leaded gasoline at about 90 or less octane rating. Variations in the specifics of the fuel initiation and end curves are necessarily dependent upon the design of the specific engine involved; however curves of the general shape have been found to produce excellent results in actual applications.

The shape of the map signal generator, as depicted graphically in FIGS. 12 and 13, thus provides a method of initiating delivery fuel into the combustion chamber when the piston member moving cyclically reaches a preselected position in the chamber, i.e., the crank angle depicted in its vertical axes, and varying the initiation of delivery relative to this preselected position on order to vary engine speed. Control of ignition is accomplished by creating the spark discharge whenever the piston member reaches a different predetermined position within the chamber, such control including the ability to advance spark relative to engine speed, i.e., varying the occurrence of spark relative to the predetermined piston position in accordance with engine speed.

Besides the various advantages described above, the ability offered by the invention of precisely controlling combustion permits an existing engine to operate in a wider range of fuels, including gases such as hydrogen, methane, ethane and lower octane fuels. This control also readily reduces the variation of performance between cylinders of a multi-cylinder engine to eliminate lazy and overworked cylinders and the attendant wear.

The method and apparatus disclosed herein eliminates the need of vacuum advance of spark discharge, as well as all carburetion, and offers the possibility of reducing the number of secondary emission control devices required. These and other advantages thus may produce a simpler, more economical engine of higher efficiency.

The attributes of essentially eliminating fuel layering upon the chamber walls and presenting an essentially fuel-free oxidizing gas envelope at the chamber walls insures more complete fuel burning, reduces the blow-by of fuel past the piston into the crankcase to reduce oil contamination, as well providing better control over combustion. The oxidizing gas envelope presents a heat insulator minimizing unnecessary heating of the chamber walls. In contrast, it has been found that in conventional internal combustion engines up to 60 percent or more of heat developed by combustion is lost in heating the chamber walls.

The invention has also been found to permit an engine to operate at generally optimum efficiencies over a wider range of ratios between the total fuel delivered and total air delivered for a given combustion event. Thus, the overall air-to-fuel ratio is not as critical, meaning the engine performance is less affected by external parameters such as atmospheric pressure, dew point, ambient temperature, and engine wear. Accordingly, engine performance is far less affected by cold weather than is the case in conventional systems.

Another advantage of the invention is a lowered tendency of occurrence of pre-ignition knock. Because no fuel is usually delivered during intake, but rather only the oxidizing gas, any hot spots present in the engine cannot cause pre-ignition, but instead give off their heat to the oxidizing gas. Thus, there occurs a certain recovery of heat from one combustion event (causing heating of engine materials) to the oxidizing gas of the subsequent combustion events in the engine. Also, the lack of fuel at the chamber walls reduces tendency for pre-ignition since it is less likely any fuel will be at the hot spot, and the air envelope at the chamber walls presents a heat insulator tending to prevent formation of any hot spot.

Figure 14:
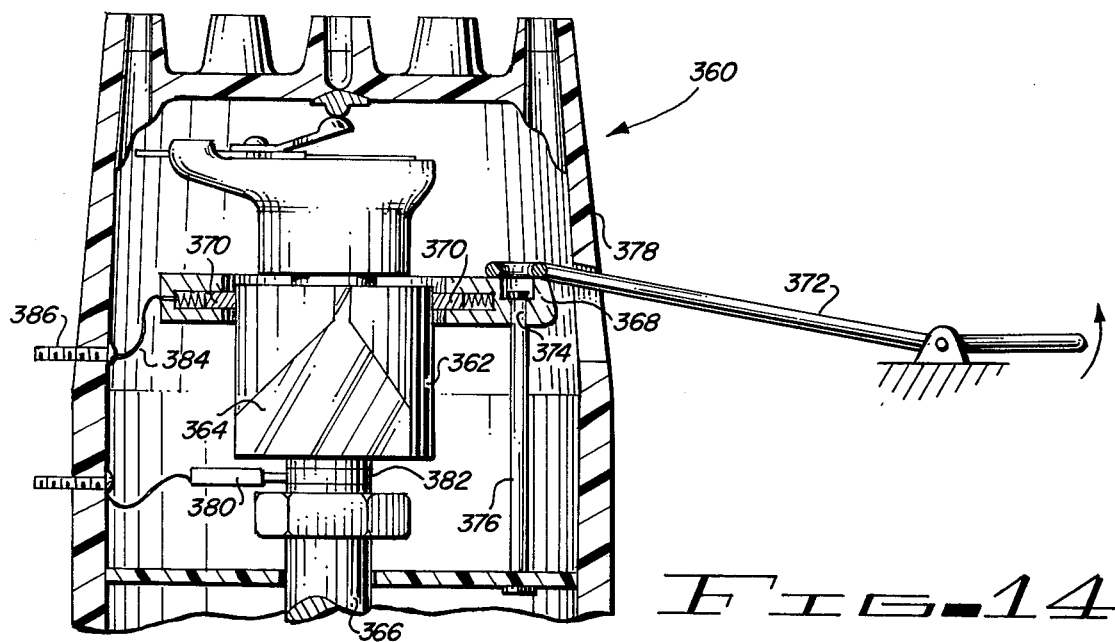
FIG. 14 is a partially schematic cross-sectional elevation view of another form of distributor unit.

FIG. 14 illustrates another form of distributor unit 360 similar to that of FIG. 2, except that a rotating drum structure 362 carrying a conductor sheet signal generator 364 is affixed to rotate with distributor shaft 366, but is not movable axially relative thereto. Instead, a non-rotating, ring-shaped signal pick-up holder 368 carrying a plurality of spring loaded brushes 370 in contact with the exterior of structure 362, is shiftable axially relative to structure 362 upon manual actuation of linkage 372 operably engaging holder 368. Holder 368 has a bore 374 accepting a rod 376 rigidly secured to the distributor housing 378, the rod acting to align the holder 368 and guide its axial movement. Similar to FIG. 1, an input brush 380 in contact with a conductive ring 382 connected to sheet 364 energizes the latter, while the brushes are respectively connected to the fuel injecting solenoid valves by a respective flexible leads 384 and terminals 386. Thus, as shaft 366 rotates, the brushes 370 repetitively contact sheet 364 to energize the solenoids for a length of time dependent upon distributor shaft speed and the axial position of holder 368 relative to structure 362. The unit 360 thus operates in manner similar to the structure of FIG. 2 and it is believed further detailed description of its operation is unnecessary.

Figure 15:
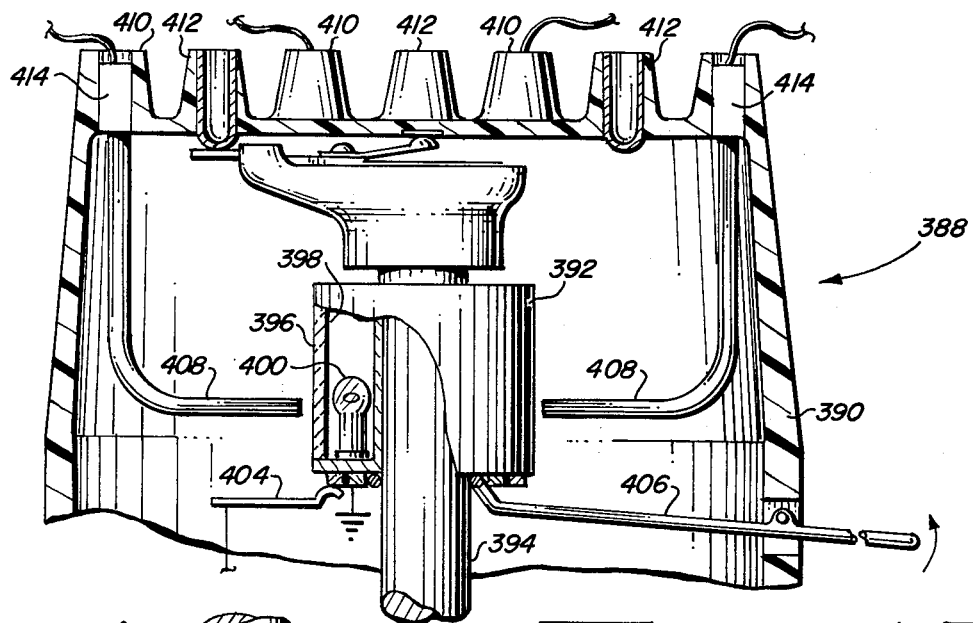
FIG. 15 is a partially schematic, cross-sectional elevation view of yet another type of distributor unit.
Figure 16:
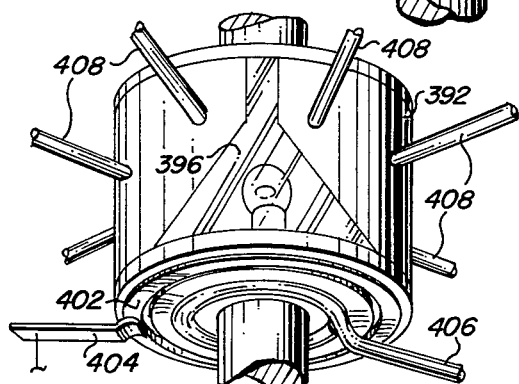
FIG. 16 is a bottom orthogonal projection of the distributor of FIG. 15.
Figure 17:
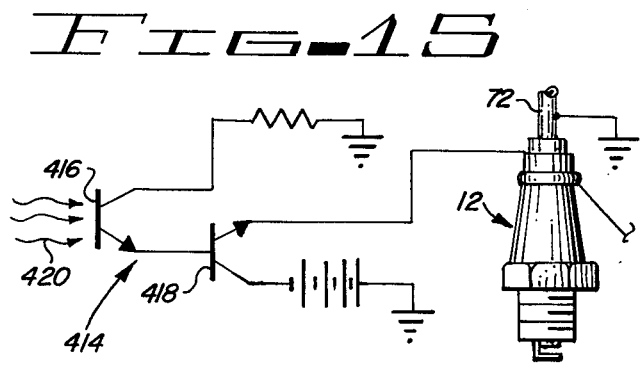
FIG. 17 is a schematic representation of the basic elements of the fuel injection signal circuitry of the distributor of FIG. 15.

A photo-optic form of distributor unit 388 is illustrated in FIGS. 15–17. Within distributor housing 390 is a drum structure 392 that is affixed to rotate with and move axially relative to distributor shaft 394. The exterior of structure 392 is opaque except for a variable width, translucent, transparent, or open "window" 396 that acts as the signal generating map in place of the conductor sheet or variable resistor of the previously described distributor units. The window 396 opens to an internal cavity 398 in structure 392 that contains an incandescent lamp 400 or other source of illumination. Lamp 400 illustrated is electrically powered and has one contact in engagement with conductive shaft 394 and another contact in engagement with conductive ring 402 that engages an axially movable brush 404 connected to a source of electrical power to energize lamp 400. An appropriate linkage 406 allows manual axial shafting of structure 392 along shaft 394.

Disposed around structure 392 are a plurality (one for each cylinder) of internally reflective light pick-up sensors or light pipes 408 that have upper ends rigidly affixed to housing 390 in fuel injection signal terminal cavities 410 spaced around the top of housing 390 radially outwardly of spark plug terminals 412. Within each cavity 410 is an electronic unit 414, schematically shown in FIG. 17, that includes as basic components, a light sensitive transistor 416 driving a relatively large capacity power transistor 418 whose collector output carries an electrical signal to operate the solenoid of one of the fuel injection spark plugs 12. Thus, light energy 420 reaching transistor 416 through the associated light pipe 408 creates a corresponding electrical signal to operate the fuel injector solenoid.

It is believed apparent that rotation of structure 392 repetitively energizes the respective electronic units 414, for a time dependent on engine speed and the position of window 396 relative to pipes 408. Subsequent operation of this unit will be similar to that previously described with respect to the other distributor units.

It will be apparent to those skilled in the art that modifications to the specific structures described above may be made. To the extent that such modifications do not depart from the scope and spirit of the invention as set forth in the appended claims, they should be considered within the scope of the invention.

Having described the invention with sufficient clarity that those skilled in the art may make and use it, what is claimed as new and desired to be secured by Letters Patent is:

1. A method of operating an internal combustion engine having a chamber defined by positive displacement elements which are relatively movable through successive cycles of operation wherein the volume of said chamber increases and decreases between maximum and minimum values having a ratio within the range of a conventional spark ignition engine and a pair of spaced electrodes defining an electrical discharge path within said chamber when at a minimum value thereof, said method comprising the steps of:
   introducing during each cycle of operation into said chamber a charge of oxidizing gas substantially free of combustible fuel,
   compressing during each cycle of operation said oxidizing gas substantially to a volume near said minimum value by the decreasing relative movement of said positive displacement elements,
   injecting during each cycle of power operation a combustible fuel as a high pressure jet directly into the oxidizing gas within said chamber at a predetermined time during the compression thereof prior to said positive displacement elements decreasing said chamber to said minimum value in a direction toward one of said electrodes and away from the other electrode so that there is established before the completion of said fuel injection within the chamber space containing said discharge path an interface between the oxidizing gas contacting said other electrode and the injected fuel moving away from said other electrode which presents a range of fuel-oxidizing gas mixture ratios which inherently includes ignitable mixture ratios and mixture ratios both too-fuel-rich and too-fuel-lean to ignite,
   causing during each cycle of power operation an electrical current to discharge between said electrodes within said chamber space along said path while said injection is taking place so as to ignite the mixture of oxidizing gas and fuel therein having an ignitable mixture ratio and to establish a flame front which continues by virtue of the continued injection of fuel and the mixture thereof with oxidizing gas within the chamber under the dynamic fluid conditions occasioned by the injected fuel momentum and the relative movement of the positive displacement elements defining the chamber so that substantially the entire charge of injected fuel is burned within an envelope of oxidizing gas in contact with the surfaces of said positive displacement elements defining said chamber,
   continuously sensing the speed of rotation of said engine and the position of a speed control mechanism for said engine, and
   utilizing the sensed engine speed and speed control mechanism position to determine the time said injection is initiated and the timer period of its continuation so as to optimize the BMEP characteristics of the engine.

2. A method as defined in claim 1 wherein a higher sensed speed and a higher speed control mechanism position are utilized to initiate said injection at an earlier time and to continue said injection for a longer time period.

3. A method as defined in claim 2 wherein the time period within which said injection is continued does not extend beyond the time during each cycle when said positive displacement elements reach said minimum value.

4. A method as defined in claim 2 wherein the time period within which said injection is continued extends beyond the time during each cycle when said positive displacement elements reach said minimum value.

5. A method as defined in claim 1 wherein the engine speed is sensed by the rotational movement of a member driven by a shaft connected to rotate at a speed proportional to the speed of said engine and wherein the position of said speed control mechanism is sensed by an axial movement of said member with respect to said shaft.

6. A method as defined in claim 5 wherein the engine speed sensed and the speed control mechanism position sensed are utilized as aforesaid by maintaining a supply of said combustible fuel under pressure, providing valve means which is normally closed to prevent communication of the combustible fuel supply with said chamber and movable in response to the establishment of an electrical current in association therewith into an open position establishing communication of the combustible fuel supply with said chamber, establishing an electrical current in association with said valve means the initiation and duration of which is a function of the axial position and speed of rotation of said member.

7. A method as defined in claim 6 wherein said electrical current is established by contacting a conductive map area on the periphery of said member with pick-up electrical brush means.

8. A method as defined in claim 6 wherein said electrical current is established by contacting a variable resistance member extending radially inwardly from the periphery of said member with pick-up electrical brush means.

9. A method as defined in claim 6 wherein said electrical current is established by transmitting light through a window in the periphery of said member and converting the transmitted light into said electrical current.

10. An internal combustion engine comprising:
positive displacement elements defining a chamber, said elements being relatively movable through successive cycles of operation wherein the volume of said chamber increases and decreases between maximum and minimum values having a ratio within the range of a conventional spark ignition engine,
a pair of spaced electrodes defining an electrical discharge path within said chamber when at a minimum value thereof,
means for introducing during each cycle of operation into said chamber a charge of oxidizing gas substantially free of combustible fuel so that during each cycle of operation said oxidizing gas will be compressed substantially to a volume near said minimum value by the decreasing relative movement of said positive displacement elements,
means or injecting during each cycle of power operation a combustible fuel as a high pressure jet directly into the oxidizing gas within said chamber at a predetermined time during the compression thereof prior to said positive displacement elements decreasing said chamber to said minimum value in a direction toward one of said electrodes and away from the other electrode so that there is established before the completion of said fuel injection within the chamber space containing said discharge path an interface between the oxidizing gas contacting said other electrode and the injected fuel moving away from said other electrode which presents a range of fuel-oxidizing gas mixture ratios which inherently includes ignitable mixture ratios and mixture ratios both too-fuel-rich and too-fuel-lean to ignite,
means for causing during each cycle of power operation an electrical current to discharge between said electrodes within said chamber space along said path while said injection is taking place so as to ignite the mixture of oxidizing gas and fuel therein having an ignitable mixture ratio and to establish a flame front which continues by virtue of the continued injection of fuel and the mixture thereof with oxidizing gas within the chamber under the dynamic fluid conditions occasioned by the injected fuel momentum and the relative movement of the positive displacement elements defining the chamber so that substantially the entire charge of injected fuel is burned within an envelope of oxidizing gas in contact with the surfaces of said positive displacement elements defining said chamber,
a speed control mechanism for said engine,
means for continuously sensing the speed of rotation of said engine and the position of said speed control mechanism, and
means for utilizing the sensed engine speed and speed control mechanism position to determine the time said injection is initiated and the time period of its continuation so as to optimize the BMEP characteristics of the engine.

11. Apparatus as defined in claim 10 wherein said last mentioned means is operable such that a higher sensed speed and a higher speed control mechanism position are utilized to initiate said injection at an earlier time and to continue said injection for a longer time period.

12. Apparatus as defined in claim 11 wherein the time period within which said injection is continued does not extend beyond the time during each cycle when said positive displacement elements reach said minimum value.

13. Apparatus as defined in claim 11 wherein the time period within which said injection is continued extends beyond the time during each cycle when said positive displacement elements reach said minimum value.

14. Apparatus as defined in claim 10 wherein said engine speed sensing means comprises a member driven by a shaft connected to rotate at a speed proportional to the speed of said engine and wherein said speed control mechanism position sensing means comprises means for sensing an axial movement of said member with respect to said shaft.

15. Apparatus as defined in claim 14 wherein the engine speed sensed and the speed control mechanism position sensed are utilized as aforesaid by means maintaining a supply of said combustible fuel under pressure, valve means normally closed to prevent communication of the combustible fuel supply with said chamber and movable in response to the establishment of an electrical current in association therewith into an open position establishing communication of the combustible fuel supply with said chamber, and means for establishing an electrical current in association with said valve means the initiation and duration of which is a function of the axial position and speed of rotation of said member.

16. Apparatus as defined in claim 15 wherein said electrical current establishing means includes a conductive map area on the periphery of said member and pick-up electrical brush means operable associated therewith.

17. Apparatus as defined in claim 15 wherein said electrical current establishing means includes a variable resistance member extending radially inwardly from the periphery of said member and pick-up electrical brush means operably associated therewith.

18. Apparatus as defined in claim 15 wherein said electrical current establishing means includes means for transmitting light through a window in the periphery of said member and means for converting the transmitted light into said electrical current.

* * * * *